US008880148B2

(12) United States Patent
Vaillant et al.

(10) Patent No.: US 8,880,148 B2
(45) Date of Patent: Nov. 4, 2014

(54) TREATMENT PROCESS OF RADIOLOGICAL IMAGES FOR DETECTION OF STENOSIS

(75) Inventors: Regis Vaillant, Buc (FR); Sebastien Gorges, Buc (FR); Vincent Bismuth, Buc (FR)

(73) Assignee: General Electric Company, Schenectady, NY (US)

( * ) Notice: Subject to any disclaimer, the term of this patent is extended or adjusted under 35 U.S.C. 154(b) by 478 days.

(21) Appl. No.: 13/290,450

(22) Filed: Nov. 7, 2011

(65) Prior Publication Data
US 2012/0123238 A1 May 17, 2012

(30) Foreign Application Priority Data

Nov. 12, 2010 (EP) .................... 10306249

(51) Int. Cl.
*A61B 5/05* (2006.01)
*G06T 7/00* (2006.01)

(52) U.S. Cl.
CPC ..... *G06T 7/0012* (2013.01); *G06T 2207/30101* (2013.01); *G06T 2207/20068* (2013.01)
USPC .......................................... 600/424; 600/407

(58) Field of Classification Search
CPC ... G06T 7/0012; A61B 6/504; A61B 19/2544
USPC ................................................ 600/407, 424
See application file for complete search history.

(56) References Cited

U.S. PATENT DOCUMENTS 6,718,193 B2   4/2004   Knoplioch et al.
7,742,629 B2   6/2010   Zarkh et al.

FOREIGN PATENT DOCUMENTS

WO     02/32307 A1     4/2002
WO   2005/071595 A1    8/2005

OTHER PUBLICATIONS

EP Search Report in connection with EP Patent Application No. 10306249.3 filed on Nov. 12, 2010 issued on Mar. 3, 2011.
Paul L. Van Herck, et al.: "Quantitative Coronary Arteriography on Digital Flat-Panel System", Catheterization and Cardiovascular Interventions, pp. 192-200, 2004.
Karl Krissian, Gregoire Malandain, Nicholas Ayache, Régis Vaillant and Yves Trousset: "Model-Based Detection of Tubular Structures in 3D Images", Computer Vision and Image Understanding, vol. 80, No. 2, p. 130-171, 2000.
Bismuth, V., et al.: "A comparison of line enhancement techniques: applications to guide-wire detection and respiratory motion tracking", vol. 7259, Feb. 8, 2009.
Nicholas, Honnorat, et al.: "Robust guidewire segmentation through boosting, clustering and linear programming", Apr. 14, 2010, pp. 924-927.

*Primary Examiner* — Rajeev Siripurapu
(74) *Attorney, Agent, or Firm* — Global Patent Operation; Marc A. Vivenzio

(57) ABSTRACT

A treatment process of radiological images is provided. The process comprises obtaining at least one set of images. For each set, the process comprises: segmenting an at least one first image to obtain an at least one first segmented image and to detect a plurality of arteries of the region of interest and an at least one second image to obtain an at least one second segmented image and to detect and isolate the tool; defining in the at least one first segmented image a plurality of lines, wherein each line defines an artery; determining, from the second segmented image and the defined lines, an artery of interest corresponding to the artery in which a tool has been inserted; and applying a quantitative analysis algorithm of coronary lesions to the artery of interest to detect lesion of the artery of interest.

20 Claims, 3 Drawing Sheets

TREATMENT PROCESS OF RADIOLOGICAL IMAGES FOR DETECTION OF STENOSIS

BACKGROUND OF THE INVENTION

1. Field of the Invention

Embodiments of the invention relate to the field of medical imaging and more particularly that of radiology, being applied to the field of vascular radiological interventional imaging.

2. Description of Related Art

Vascular interventional radiology includes procedures conducted under the control of imaging and treats myocardial ischaemia in particular.

Myocardial ischaemia is an illness affecting over a third of people in developed countries and it manifests via stenosis, that is, shrinking of an artery.

There are several treatments, including insertion of intracoronary stents, for treating this illness.

For this, a cardiologist utilizes interventional imaging which offers him characterization of possible lesions and quantification of coronary arteries and, more particularly, stenoses for selecting the dimensions of the stent to be introduced.

The cardiologist normally uses an image of the zone including an artery to be treated on which he manually positions several markers along the artery to be treated to conduct stenosis analysis, that is, to determine the place where stenosis is located and to determine the dimensions of the stent necessary for treatment of the stenosis.

This detection and quantification require interaction of the radiologist with a medical imaging device and a previous step of detection of the artery to be treated.

The disadvantage here is that detection and quantification take time and are difficult to execute for the practitioner.

BRIEF SUMMARY OF THE INVENTION

The embodiments of the present invention eliminate these disadvantages.

According to a first aspect, an embodiment of the invention relates to a treatment process of radiological images of a region of interest of a patient. The radiological images being 2D projection images, in which a longilineal tool has previously been inserted into an artery. The process comprising obtaining at least one set of images, the at least one set of images comprising an at least one first image and an at least one second image of the region of interest, the at least one first image being an image of the region of interest into which a contrast product has previously been injected, the at least one second image being an image of the region of interest without a contrast product or with a minimal quantity of contrast product, each of the at least one set of images corresponding to a given angulation. Wherein for each set, the process comprises segmenting the at least one first image to obtain an at least one first segmented image and to detect a plurality of arteries of the region of interest; segmenting the at least one second image to obtain an at least one second segmented image and to detect and isolate the tool; defining in the at least one first segmented image a plurality of lines, wherein each line defines an artery; determining, from the second segmented image and the defined lines, an artery of interest corresponding to the artery in which the tool has been inserted, wherein the defined line of the artery of interest is closest to the tool; and applying a quantitative analysis algorithm of coronary lesions to the artery of interest to detect lesion of the artery of interest.

According to a second aspect, an embodiment of the invention relates to a medical imaging system comprising a source configured to emit an X-ray beam; a detector placed opposite the source and configured to detect the X-rays emitted by the source, the source and detector being attached to an arm; and a control unit configured to control acquisition of radiological images of a region of interest of a patient. The control unit being operatively connected to the arm, wherein the medical imaging system is operatively connected to a treatment system configured to obtain at least one set of images, the at least one set of images comprising an at least one first image and an at least one second image of the region of interest, the at least one first image being an image of the region of interest into which a contrast product has previously been injected, the at least one second image being an image of the region of interest without a contrast product or with a minimal quantity of contrast product, each of the at least one set of images corresponding to a given angulation. Wherein for each set, the treatment system is configured to segment the at least one first image to obtain an at least one first segmented image and to detect a plurality of arteries of the region of interest; segment the at least one second image to obtain an at least one second segmented image and to detect and isolate the tool; define in the at least one first segmented image a plurality of lines, wherein each line defines an artery; determine, from the second segmented image and the defined lines, an artery of interest corresponding to the artery in which a tool has been inserted, wherein the defined line of the artery of interest is closest to the tool; and apply a quantitative analysis algorithm of coronary lesions to the artery of interest to detect lesion of the artery of interest.

Because of detection of the artery of interest, quantification of the stenosis is enabled without the need to manually define points along an artery and thus without interaction with the medical imaging system.

This contributes rapidity and simplicity in executing detection of vascular lesions.

BRIEF DESCRIPTION OF THE SEVERAL VIEWS OF THE DRAWINGS

Other characteristics and advantages of embodiments of the invention will emerge from the following description which is purely illustrative and non-limiting and must be considered in reference to the attached diagrams, in which.

DETAILED DESCRIPTION OF THE INVENTION

Figure 1:
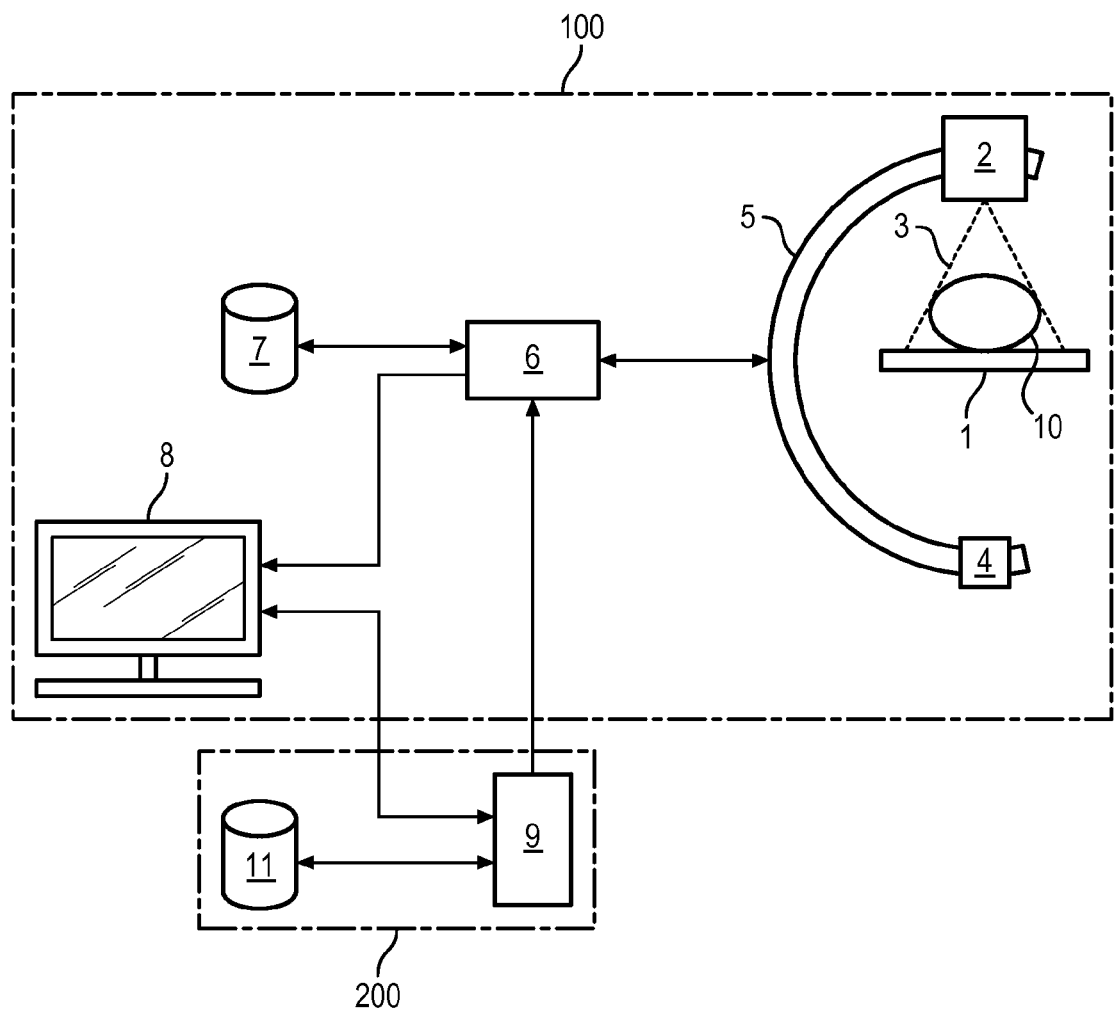
FIG. 1 illustrates a medical imaging system according to an embodiment of the invention.

FIG. 1 schematically illustrates a medical imaging system 100 for acquisition of radiological images.

The medical imaging system 100 comprises a support 1 for receiving a patient 10 to be examined, a source 2 designed to emit an X-ray beam 3, a detector 4 placed opposite the source 2 and configured to detect the X-rays emitted by the source 2, a control unit 6, a storage unit 7 and a display unit 8.

The source 2 of X-rays and the detector 4 are attached by a C-shaped arm 5. Such an arm 5 is more commonly known as an arch. The arm 5 can be oriented according to three degrees of liberty.

The detector 4 can be a semiconductor image sensor comprising, for example, caesium phosphorous iodide (scintillater) on a transistor/photodiode matrix of amorphous silicon. Other adequate detectors are: a CCD sensor, a direct digital detector which directly converts X-rays into digital signals. The detector 4 illustrated in FIG. 1 is planar and defines a planar image surface, while other geometries can be suitable.

The control unit 6 is connected to the arch 5 by wire or wireless connection. The control unit 6 controls acquisition by fixing several parameters such as the dose radiation to be emitted by the X-ray source and the angular positioning of the arm 5. The control unit 6 controls the position of the arm 5, that is, the position of the source 2 relative to the detector 4.

The control unit 6 can comprise a reading device (not shown) for example a disc reader or a CD-ROM reader, DVD-ROM reader, or connection ports for reading the instructions of the treatment process of an instruction medium (not shown), such as a diskette, a CD-ROM, DVD-ROM, or USB key or more generally by any removable memory medium or even via a network connection.

The storage unit 7 is connected to the control unit 6 for recording acquired parameters and images. It is possible to have the storage unit 7 located inside the control unit 6 or outside it.

The storage unit 7 can be formed by a hard drive or SSD, or any other removable and rewritable storage means (USB keys, memory cards etc.). The storage unit 7 can be ROM/RAM memory of the control unit 6, a USB key, a memory card, memory of a central server.

The display unit 8 is connected to the control unit 6 for displaying acquired images and/or information on the acquisition control parameters.

The display unit 8 can be for example a computer screen, a monitor, a flat screen, a plasma screen or any other type of display device of known type.

Such a display unit 8 allows a practitioner to control acquisition of radiological images.

The medical imaging system 100 is coupled to a treatment system 200. The treatment system 200 comprises a calculation unit 9 and storage unit 11.

The treatment system 200 receives images acquired and stored in the storage unit 7 of the medical imaging system 100 which it uses to carry out a certain number of treatments (see below).

Transmission of data of the storage unit 7 of the medical imaging system 100 to the calculation unit 9 of the treatment system 200 can be done via an internal or external information network or by means of any adequate physical memory medium such as diskettes, CD-ROM, DVD-ROM, external hard drive. USB key, SD card, etc.

The calculation unit 9 is for example a computer or computers, a processor or processors, a microcontroller or microcontrollers, a micro-computer or micro-computers, a programmable automaton or automatons, a specific integrated application circuit or circuits, other programmable circuits, or other devices which include a computer such as a workstation.

As a variant, the calculator 9 can comprise a reading device (not shown) for example a diskette reader, a CD-ROM or DVD-ROM reader, or connection ports for reading the instructions of the treatment process of an instruction medium (not shown), such as a diskette, CD-ROM, DVD-ROM or a USB key or more generally by any removable memory medium or even via a network connection.

Also, the treatment system comprises a storage unit 11 for storage of data generated by the calculation unit 9.

The calculation unit 9 can be connected to the display unit 8 (as in FIG. 1) or else to another display unit (not shown).

Figure 2:
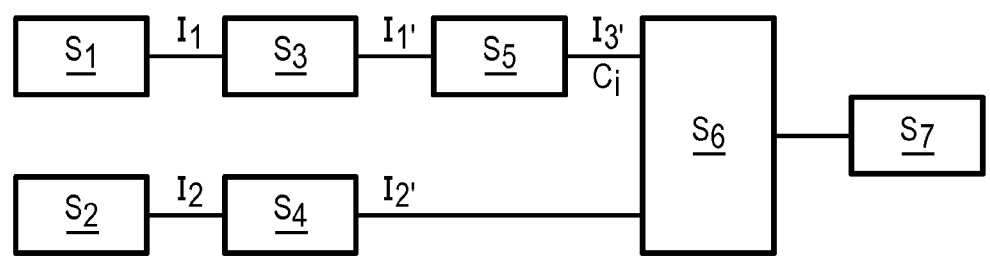
FIG. 2 schematically illustrates a treatment process of radiological images according to an embodiment of the invention.

An embodiment of the treatment process of radiological images according to the invention is described hereinbelow. FIG. 2 schematically illustrates a treatment process of radiological images according to an embodiment of the invention.

The treatment process of radiological images utilizes two radiological images $I_1$, $I_2$ of a region of interest of a patient, into which a tool has previously been introduced, hereinbelow a longilineal tool.

This type of tool is for example a guide wire, a catheter or a combination thereof, and is preferably a guide wire to enable easy introduction of a stent.

The first image $I_1$ corresponds to a radiological image of the region of interest into which a contrast product has been injected. Such product is for example iodine and the region of interest is typically the coronary region of a patient to be treated.

The second image $I_2$ corresponds to a radiological image of the region of interest, without contrast product or with a minimal quantity of contrast product.

Minimal quantity of contrast product means a quantity of contrast product which displays the tool without it being masked by arteries.

The first and second images $I_1$, $I_2$ can be obtained by way of acquisition means employed throughout the treatment process of radiological images, or can be obtained from a storage unit of the medical imaging system.

It is noted that the first and second images $I_1$, $I_2$ originate from acquisitions made by means of the medical imaging system described hereinabove for given angulation that is, orientation of the X-ray source relative to the normal to the support on which the patient is placed.

The first and second images $I_1$, $I_2$ are 2D projection images,

In the rest of the description a set of images is defined as being the couple constituted by the first and second images acquired for given angulation.

A sequence of sets of images is also considered, that is, for given angulation several sets of images $I_1$, $I_2$ acquired at different times.

Segmentation S3 of the first image $I_1$ consists of extracting and isolating, from the first image $I_1$, and due to the injected contrast product, the arteries of the patient.

More precisely, it is the network of arteries of the region of interest which is extracted and isolated.

Figure 3:
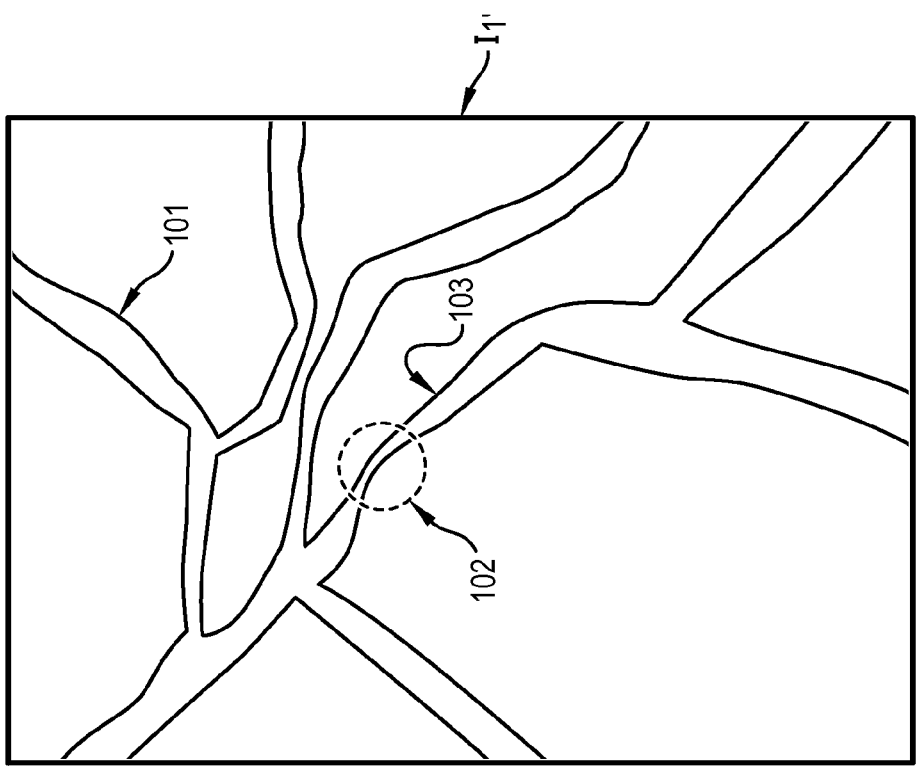
FIG. 3 illustrates a first image obtained by the treatment process of radiological images according to an embodiment of the invention.

FIG. 3 schematically illustrates an example of a first segmented image $I_1'$ comprising a network 101 of arteries of the patient displayed, an artery 103 comprising shrinkage 102 corresponding to a lesion to be detected.

Segmentation S4 of the second image $I_2$ consists of extracting and isolating, from the displayed region of interest without contrast product, the tool inserted into an artery of interest of the patient.

Figure 4:
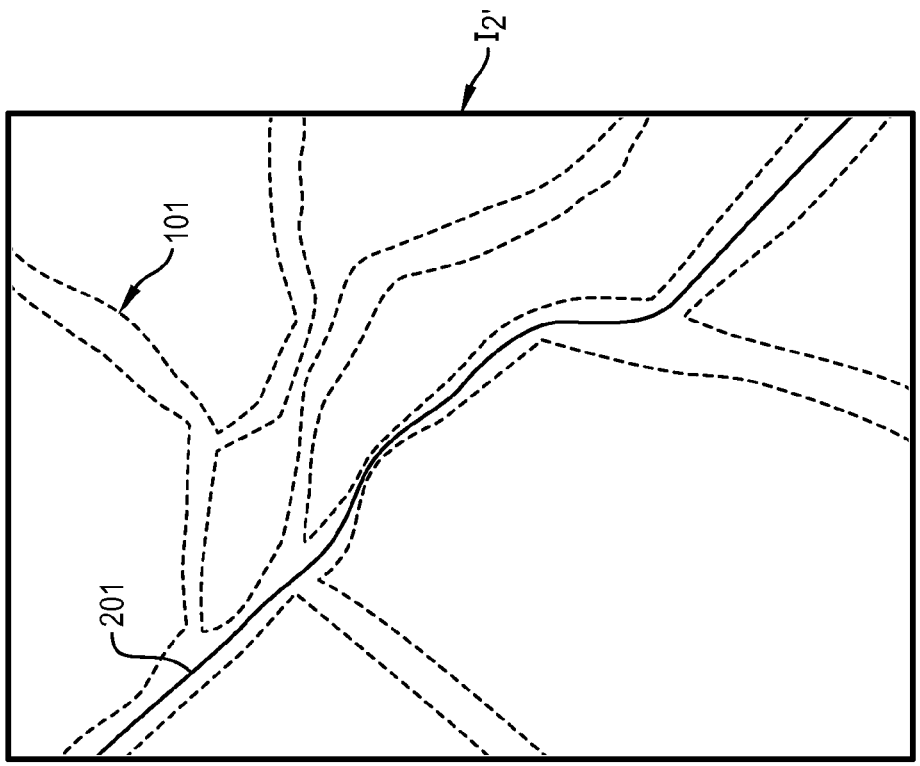
FIG. 4 illustrates a second image obtained by the treatment process of radiological images according to an embodiment of the invention.

FIG. 4 schematically illustrates an example of a second segmented image $I_2'$ comprising the same network 101 as that of the first segmented image $I_1'$ illustrated in broken lines, as well as a tool 201, here a guide wire inserted into an artery of the network 101 of arteries. In practice, on completion of this segmentation step S4, only the tool is displayed in the image $I_2'$, while the network 101 is represented here by way of indication.

It is noted that segmenting an image is a technique well known to the person skilled in the art and will not be described in any further detail.

Definition S5 of the lines of the arteries consists of defining for each artery a line $C_i$, for example a central line defining an axis of symmetry of an artery.

The definition of the central lines $C_i$ is for example implemented by means of a technique described in the document by Karl Krissian, Gregoire Malandain, Nicholas Ayache, Régis Valliant and Yves Trousset: "*Model-Based Detection of Tubular Structures in 3D Images*", Computer Vision and Image Understanding, Vol, 80, num. 2, p. 130-171, 2000.

Figure 5:
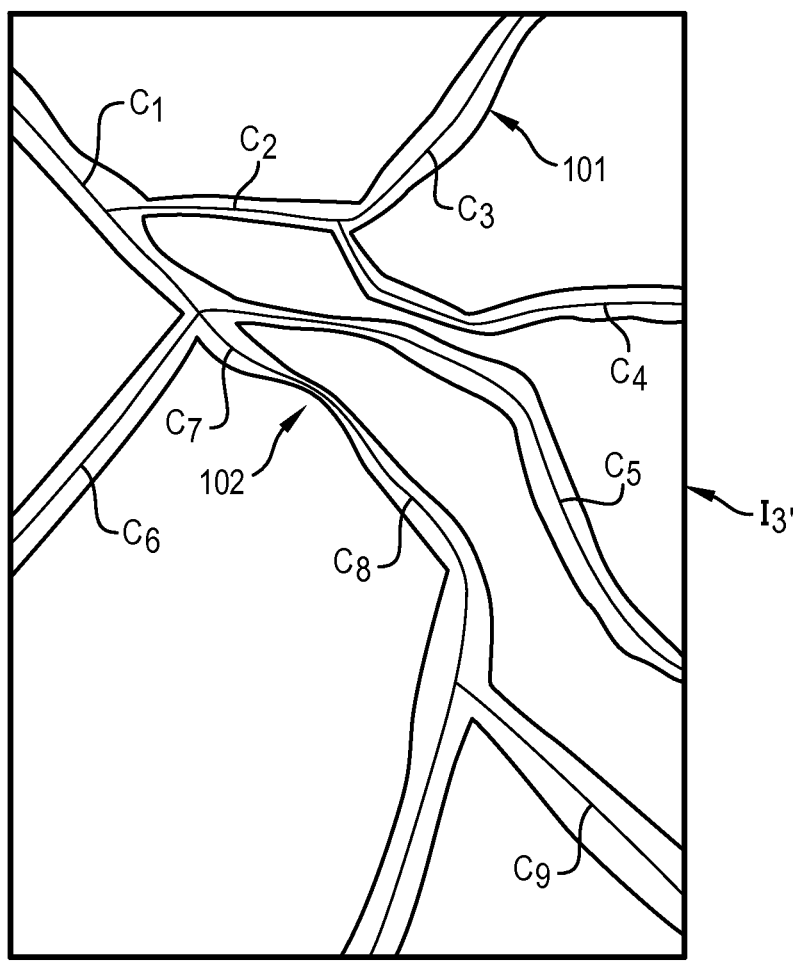
FIG. 5 schematically illustrates an artery of interest obtained during the treatment process of radiological images according to an embodiment of the invention.

FIG. 5 illustrates an image $I_3'$ thr which nine central lines $C_i$ (i=1 to 9) have been defined in the network of arteries 101.

Detection S6 of the artery comprising the tool consists of detecting an artery of interest, that is, the artery into which the tool has been inserted.

Detection of the artery of interest is carried out from the second image $I_2'$ and from the image $I_3'$.

Such detection is carried out using a distance criterion between the tool 201 isolated and detected in the second segmented image $I_2'$ and the defined central lines $C_i$.

The artery of interest corresponds to the artery for which the distance between the tool and the central line C is minimal.

This can be a distance criterion combining the Euclidian distance of a central line C of an artery and evaluation of the difference in orientation of the tool with this central line C.

Once the artery of interest in which the tool has been inserted is identified, determination S7 of possible stenosis of the artery of interest can proceed by quantitative analysis.

For this to happen, a process of quantitative analysis of coronary lesions ("*Quantitative Coronary Analysis*", (QCA)) is applied to the artery of interest.

Such a process of analysis is described for example in the document by Paul L. Van Herck, et al.: "*Quantitative coronary Arteriography on Digital Flat-Panel System*", Catheterization and Cardiovascular Interventions, pp. 192-200, 2004.

QCA analysis is based on an algorithm clinically valid for detection of contours and enables to determine a percentage of occlusion, the occlusion of the diameter and the size of the normal artery and of the artery exhibiting stenosis.

In particular, such an algorithm analyses the artery all along the central line C and in particular determines at each point of the central line the apparent diameter of the artery. The variations in this diameter and decreases in particular are indicators of the presence of pathology such as for example arterial stenosis. Quantification consists of determining such a decrease by a percentage relative to a zone of normal diameter.

The process described above can be applied to several 2D projection images taken for different angulations.

Using 3D reconstruction of known type and applicable to lines can produce 3D lines which describe the geometry of the artery. More particularly, it is possible to obtain a 3D view of the artery of interest.

This can be applied to a sequence of images to obtain a sequence of 3D images and consequently obtain the following elements: analysis of the projection of the movement of arteries described by evolution of lines identified in the sequence of images; quantitative analysis of the projection of the arteries in the succession of images; analysis of the movement of the artery in three-dimensional space from treatment of several sequences of images acquired according to different angulations; and three-dimensional and temporal quantitative analysis of the artery of interest.

The treatment process of radiological images can be implemented advantageously in the form of a computer program comprising machine instructions for executing the process.

What is claimed is:

1. A treatment process of radiological images of a region of interest of a patient, the radiological images being 2D projection images, in which a longilineal tool has previously been inserted into an artery, the process comprising:
   using a treatment system and a calculation unit,
   obtaining at least one set of images, the at least one set of images comprising an at least one first image and an at least one second image of the region of interest, the at least one first image being an image of the region of interest into which a contrast product has previously been injected, the at least one second image being an image of the region of interest without a contrast product or with a minimal quantity of contrast product, each of the at least one set of images corresponding to a given angulation, wherein for each set, the process comprises:
   segmenting the at least one first image to obtain an at least one first segmented image and to detect a plurality of arteries of the region of interest;
   segmenting the at least one second image to obtain an at least one second segmented image and to detect and isolate the tool;
   defining in the at least one first segmented image a plurality of lines, wherein each line defines an artery;
   determining, from the second segmented image and the defined lines, an artery of interest corresponding to the artery in which the tool has been inserted, wherein the defined line of the artery of interest is closest to the tool; and
   applying a quantitative analysis algorithm of coronary lesions to the artery of interest to detect lesion of the artery of interest.

2. The process according to claim 1, wherein applying the quantitative analysis algorithm comprises using points placed along the line of the artery of interest.

3. The process according to claim 1, wherein determining the artery of interest comprises employing a distance criterion combining the Euclidian distance of a line of an artery and evaluation of the difference in orientation of the tool with this line along the curve defining the longilineal tool.

4. The process according to claim 1, wherein the plurality of lines are central lines each defining an axis of symmetry of an artery.

5. The process according to claim 1, wherein at least two sets of images are obtained, and wherein the process comprises, on completion of determining the artery of interest for each set, reconstructing the at least two sets of images to obtain a 3D image of the artery of interest.

6. The process according to claim 5, wherein the quantitative analysis algorithm is used on the 3D image of the artery of interest.

7. The process according to claim 1, further comprising obtaining a sequence of sets of images and identifying the artery of interest for each set of images to obtain a field of bidimensional movement of the line of the artery of interest.

8. The process according to claim 1, further comprising obtaining a plurality of sequences of sets of images, wherein the quantitative analysis algorithm is used on each set of images to obtain the field of movement projected in the image of the line of the artery of interest.

9. The process according to claim 1, wherein the radiological images obtained are images previously acquired and stored in a storage unit of a medical imaging system.

10. A medical imaging system, comprising:
a source configured to emit an X-ray beam;
a detector placed opposite the source and configured to detect the X-rays emitted by the source, the source and detector being attached to an arm; and
a control unit configured to control acquisition of radiological images of a region of interest of a patient, the control unit being operatively connected to the arm, wherein the medical imaging system is operatively connected to a treatment system configured to:
obtain at least one set of images, the at least one set of images comprising an at least one first image and an at least one second image of the region of interest, the at least one first image being an image of the region of interest into which a contrast product has previously been injected, the at least one second image being an image of the region of interest without a contrast product or with a minimal quantity of contrast product, each of the at least one set of images corresponding to a given angulation, wherein for each set, the treatment system is configured to:
  segment the at least one first image to obtain an at least one first segmented image and to detect a plurality of arteries of the region of interest;
  segment the at least one second image to obtain an at least one second segmented image and to detect and isolate the tool;
  define in the at least one first segmented image a plurality of lines, wherein each line defines an artery;
  determine, from the second segmented image and the defined lines, an artery of interest corresponding to the artery in which a tool has been inserted, wherein the defined line of the artery of interest is closest to the tool; and
  apply a quantitative analysis algorithm of coronary lesions to the artery of interest to detect lesion of the artery of interest.

11. The medical imaging system according to claim 10, further comprising a display unit.

12. The medical imagining system according to claim 10, further comprising a storage unit.

13. The medical imaging system according to claim 12, wherein the radiological images obtained are images previously acquired and stored in the storage unit of the medical imaging system.

14. The medical imaging system according to claim 10, wherein the treatment system is further configured to apply the quantitative analysis algorithm by using points placed along the line of the artery of interest.

15. The medical imaging system according to claim 10, wherein the treatment system is further configured to determine the artery of interest by employing a distance criterion combining the Euclidian distance of a line of an artery and evaluation of the difference in orientation of the tool with this line along the curve defining the longilineal tool.

16. The medical imaging system according claim 10, wherein the plurality of lines are central lines each defining an axis of symmetry of an artery.

17. The medical imaging system according claim 10, wherein at least two sets of images are obtained, and wherein the treatment system is further configured to, on completion of determining the artery of interest for each set, reconstruct the at least two sets of images to obtain a 3D image of the artery of interest.

18. The medical imaging system according to claim 17, wherein the quantitative analysis algorithm is used on the 3D image of the artery of interest.

19. The medical imaging system according to claim 10, wherein the treatment system is further configured to obtain a sequence of sets of images and identify the artery of interest for each set of images to obtain a field of bidimensional movement of the line of the artery of interest.

20. The medical imaging system according to claim 10, wherein the treatment system is further configured obtain a plurality of sequences of sets of images, wherein the quantitative analysis algorithm is used on each set of images to obtain the field of movement projected in the image of the line of the artery of interest.

* * * * *

UNITED STATES PATENT AND TRADEMARK OFFICE
CERTIFICATE OF CORRECTION

| | | |
|---|---|---|
| PATENT NO. | : 8,880,148 B2 | Page 1 of 1 |
| APPLICATION NO. | : 13/290450 | |
| DATED | : November 4, 2014 | |
| INVENTOR(S) | : Vaillant et al. | |

It is certified that error appears in the above-identified patent and that said Letters Patent is hereby corrected as shown below:

In the Specification

In Column 3, Line 56, delete "drive." and insert -- drive, --, therefor.

In Column 4, Line 40, delete "images," and insert -- images. --, therefor.

In Column 5, Line 10, delete "Valliant" and insert -- Vaillant --, therefor.

In Column 5, Line 12, delete "Vol," and insert -- Vol. --, therefor.

In Column 5, Line 13, delete "thr" and insert -- for --, therefor.

In the Claims

In Column 8, Line 1, in Claim 12, delete "imagining" and insert -- imaging --, therefor.

Signed and Sealed this
Fifth Day of May, 2015

Michelle K. Lee
*Director of the United States Patent and Trademark Office*